Sept. 7, 1926.  J. M. SHORT  1,599,251
FLAG CARRIER FOR AUTOMOBILES
Filed Sept. 5, 1925
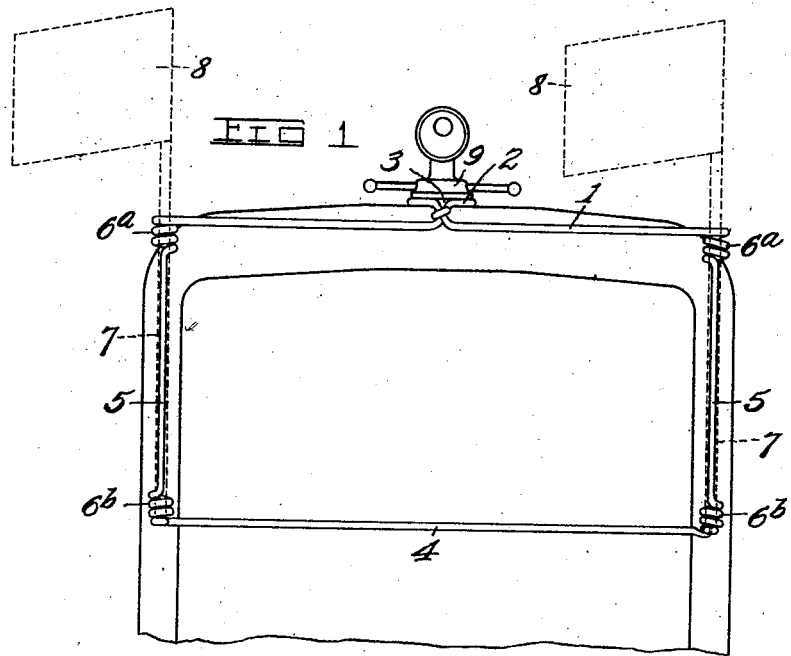
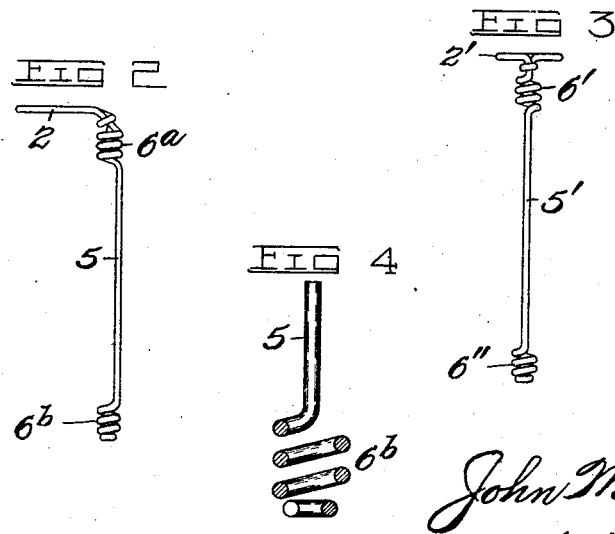
INVENTOR
John M. Short
BY N. E. Dunlap
ATTORNEY Patented Sept. 7, 1926.

1,599,251

UNITED STATES PATENT OFFICE.

JOHN M. SHORT, OF WHEELING, WEST VIRGINIA.

FLAG CARRIER FOR AUTOMOBILES.

Application filed September 5, 1925. Serial No. 54,683.

This invention relates broadly to flag supports, and more specifically to a flag support or holder to be carried on automobiles, whereby flags, pennants and the like may be conspicuously and conveniently displayed on the front of automobiles.

The primary object of the invention is to provide a simple and inexpensive flag support for automobiles which may be readily attached to the radiator of an automobile and which may be equally as readily detached when not in use.

A further object of the invention is to provide a device of the character mentioned which will at all times support flags, pennants and the like in an upright position in front of an automobile in such manner that said flags when in the holder or support will not obscure the driver's view of the roadway directly in front of the car.

A still further object of the invention is to provide a flag holder which will hold said flags in such manner that they are not readily liable to chance removal, as by the action of wind when driving, and, at the same time, permit of free rotary movement of the flag staffs, thus preventing winding of the flags upon their staffs.

With these and other objects in view, the invention resides in the features of construction which will hereinafter be fully described, reference being had to the accompanying drawings, in which—

Figure 1 is a front elevation of the invention, illustrating its application;

Figure 2 is an end view of the same;

Figure 3 is a front elevation of a modified form of the invention; and—

Figure 4 is an enlarged vertical section of one of the lower flag supporting coils.

Referring to Fig. 1 of said drawings, the device comprises a rectangular frame formed of a single length of heavy wire, having its upper horizontal member 1 bent at a point midway between its ends to form a rearwardly extending loop 2 which encircles the filler spout 3 of the radiator of an automobile and which supports the frame in position relative to said radiator. The horizontal member 1 of said frame extends across the front of the radiator slightly below the top and terminates at a point inside the frame of the radiator, while the lower horizontal member 4 is spaced from the upper member a suitable distance, as shown.

Connecting said members 1 and 4 are the vertical members 5, said members being twisted spirally at each end before meeting the members 1 and 4 to form coils 6$^a$ and 6$^b$, said coils being designed for the reception of the staff 7 of a flag 8, indicated in dotted lines in Fig. 1. The coils 6$^b$ have their lowermost turn of smaller diameter than the remainder of the turns so as to form a seat for the lower end of the flag staff.

The frame is held rigidly in place on the radiator filler spout 3 of the automobile by threading the radiator cap 9 downward over the exterior threads of the spout into binding relation to the loop 2.

In the modification shown in Fig. 3, which is designed as a carrier for a single flag, a single upright member 5' has coils 6' and 6" formed at or adjacent to its upper and lower ends, and is terminated at its upper end in a rearwardly directed loop 2' for embracing the filler spout of the radiator.

What is claimed is—

A flag support for automobiles comprising a substantially rectangular wire frame adapted to be disposed in front of and parallel to the front face of an automobile radiator, the upper part of said frame having a rearwardly directed member for attachment to the filler spout of the radiator, spaced alined coils formed at an end of said frame adapted to receive the staff of a flag, said coils being disposed to have positive engagement with the front face of said radiator, and the intermediate part of the frame between said coils being adapted to have line contact with said staff.

In testimony whereof, I affix my signature.

JOHN M. SHORT.